US009007373B2

(12) United States Patent
Lockerman et al.

(10) Patent No.: US 9,007,373 B2
(45) Date of Patent: Apr. 14, 2015

(54) SYSTEMS AND METHODS FOR CREATING TEXTURE EXEMPLARS

(75) Inventors: Yitzchak Lockerman, Jamaica, NY (US); Holly Rushmeier, Old Saybrook, CT (US); Julie Dorsey, Madison, CT (US)

(73) Assignee: Yale University, New Haven, CT (US)

( * ) Notice: Subject to any disclaimer, the term of this patent is extended or adjusted under 35 U.S.C. 154(b) by 450 days.

(21) Appl. No.: 13/272,091

(22) Filed: Oct. 12, 2011

(65) Prior Publication Data

US 2013/0093768 A1   Apr. 18, 2013

(51) Int. Cl.
*G06T 17/00* (2006.01)
*G09G 5/37* (2006.01)
*G06T 11/00* (2006.01)

(52) U.S. Cl.
CPC ........................... *G06T 11/001* (2013.01)

(58) Field of Classification Search
CPC ............... A61B 2560/0233; A61B 5/0075; B32B 2439/70; B32B 27/08; G06T 11/001; H04N 9/3147; H04N 9/3194; G01V 11/00; G01V 1/34
USPC .......................................................... 345/428
See application file for complete search history.

(56) References Cited

U.S. PATENT DOCUMENTS

| | | | |
|---|---|---|---|
| 7,973,798 B2* | 7/2011 | Wei et al. ....................... 345/582 |
| 2003/0164838 A1 | 9/2003 | Guo et al. | |
| 2005/0007378 A1 | 1/2005 | Grove | |
| 2005/0128210 A1 | 6/2005 | Berger | |
| 2005/0128211 A1* | 6/2005 | Berger et al. ................. 345/582 |
| 2006/0020204 A1 | 1/2006 | Serra et al. | |
| 2006/0082571 A1 | 4/2006 | McDaniel | |
| 2006/0232583 A1 | 10/2006 | Petrov et al. | |
| 2007/0122027 A1 | 5/2007 | Kunita et al. | |
| 2007/0146360 A1 | 6/2007 | Clatworthy et al. | |
| 2007/0146372 A1 | 6/2007 | Gee et al. | |
| 2007/0182738 A1 | 8/2007 | Feldman et al. | |
| 2008/0001962 A1 | 1/2008 | Lefebvre et al. | |
| 2008/0024469 A1* | 1/2008 | Damera-Venkata et al. . 345/204 |
| 2008/0252527 A1 | 10/2008 | Garcia | |
| 2009/0284550 A1 | 11/2009 | Shimada et al. | |

(Continued)

OTHER PUBLICATIONS

Bae, S.H., et al., "ILoveSketch: As-Natural-As-Possible Sketching System for Creating 3D Curve Models", Proceedings of the 21st Annual ACM Symposium on User Interface Software and Technology (UIST '08), pp. 151-160 (2008).

(Continued)

*Primary Examiner* — Jason M Repko
*Assistant Examiner* — Kwang Lee
(74) *Attorney, Agent, or Firm* — Mintz Levin Cohn Ferris Glovsky and Popeo, P.C.

(57) ABSTRACT

A system, method and a computer-readable medium for creating texture exemplars from images are provided. The texture exemplars are created by receiving an image containing a plurality of pixels representing a plurality of textures, wherein each texture in the plurality of textures is configured to be selectable by a user, determining a desired texture in the plurality of textures contained within the image and defining a scale of the desired texture, generating a heat mapping of the image, wherein the heat mapping indicates location of the desired texture, generating, based on the heat mapping, a plurality of tiles corresponding to the defined scale of the desired texture, and generating an exemplar of desired texture.

57 Claims, 14 Drawing Sheets

(56) References Cited

U.S. PATENT DOCUMENTS

| | | | |
|---|---|---|---|
| 2009/0315978 A1 | 12/2009 | Wurmlin et al. | |
| 2010/0085351 A1 | 4/2010 | Deb et al. | |
| 2010/0118025 A1* | 5/2010 | Smith et al. | 345/418 |
| 2010/0141648 A1 | 6/2010 | Bell et al. | |
| 2010/0225642 A1 | 9/2010 | Murray et al. | |
| 2011/0050703 A1* | 3/2011 | Artan et al. | 345/440 |
| 2011/0074772 A1 | 3/2011 | Wada et al. | |
| 2011/0169829 A1 | 7/2011 | Berger et al. | |
| 2011/0176179 A1 | 7/2011 | Judelson | |
| 2011/0202856 A1 | 8/2011 | Handley et al. | |
| 2012/0007862 A1 | 1/2012 | Shefi | |
| 2012/0106830 A1* | 5/2012 | Bama et al. | 382/154 |
| 2012/0176366 A1 | 7/2012 | Genova | |

OTHER PUBLICATIONS

Cohen, J.M., et al., "Harold: A World Made of Drawings", Proc. of the symposium on Nonphotorealistic Animation and Rendering (NPAR), pp. 83-90 (2000).

Efros, A.A., et al., "Image Quilting for Texture Synthesis and Transfer", Proceedings of the 28th Annnual Conference on Computer Graphics and Interactive Techniques, SIGGRAPH '01, ACM, pp. 341-346 (2001).

Garland, M., et al., "Parallel Computing Experiences with CUDA", Micro, IEEE 28:4, pp. 13-27, (2008).

Igarashi, T., et al., "Teddy: A Sketching Interface for 3D Freeform Design", SIGGRAPH '99, pp. 409-416 (1999).

Kallio, K., "3D6B Editor: Projective 3D Sketching with Line-Based Rendering", Proc. of Eurographics Workshop on Sketch-based Interfaces and Modeling, pp. 73-79 (2005).

Kalnins, R.D., et al., "WYSIWYG NPR: Drawing Strokes Directly on 3D Models", ACM Trans. On Graph. 21:3, pp. 755-762 (2002).

Lau, M., et al., "Modeling-In-Context: User Design of Complementary Objects with a Single Photo", Proc. Symposium on Sketch-Based Interfaces and Modeling, pp. 1-8 (2010).

Muja, M., "Flann—Fast Library for Approximate Nearest Neighbors" (2009).

Olsen, D.R., Jr., et al.., "Edge-Respecting Brushes", Proceedings of the 21st Annual ACM Symposium on User Interface Software and Technology (UIST '08), ACM, pp. 171-180 (2008).

Pollefeys, M., et al., "Visual Modeling with a Hand-Held Camera", Int. J. Computer Vision, 59:3, pp. 207-232 (2004).

Rother, C., et al., "Grabcut: Interactive Foreground Extracting Using Interated Graph Cuts", ACM Trans. Graph. 23, pp. 309-314 (2004).

Sachs, E., et al., "3-Draw: A Tool for Designing 3D Shapes", IEEE Comput. Graph. Appl., 11:6, pp. 18-26 (1991).

Sando, T., et al., "Effects of Animation, User-Controlled Interactions, and Multiple Static Views in Understanding 3D Structures", Proc. Applied Perception in Graphics and Visualization, ACM, pp. 69-76 (2009).

Snavely, N., "Phototourism: Exploring Photo Collections in 3D", ACM Trans. Graph 25:3, pp. 835-846 (2006).

Sollenberger, R.L., et al., "Effects of Stereoscopic and Rotational Displays in a Three-Dimensional Pathtracing Task", Human Factors 35:3, pp. 483-499 (1993).

Sutherland, I.E., et al.., "Sketchpad: A Man-Machine Graphical Communication System", New York Garland Publishers (1980).

Tolba, O., et al.., "A Projective Drawing System", Proc. of Symposium on Interactive 3D graphics (SI3D), pp. 25-34 (2001).

Tsang, S., et al., "A Suggestive Interface for Image Guided 3D Sketching", Proc. of the SIGCHI Conference on Human Factors in Computing Systems (CHI), pp. 591-598 (2004).

Ventura, J., et al., "A Sketch-Based Interface for Photo Pop-Up", Proc. Eurographics Symposium on Sketch-Based Interfaces and Modeling, pp. 21-28 (2009).

Zeleznik, R.C., et al.., "Sketch: An Interface for Sketching 3D Scenes", SIGGRAPH '96, pp. 163-170 (1996).

International Search Report for PCT/US2012/059742 mailed Mar. 11, 2013.

International Search Report for PCT/US2013/050707 mailed Jan. 15, 2014.

* cited by examiner

SYSTEMS AND METHODS FOR CREATING TEXTURE EXEMPLARS

TECHNICAL FIELD

The subject matter described herein relates to data processing and in particular, to creation of texture exemplars from images.

BACKGROUND

Graphics are visual presentations on some surface, such as a wall, canvas, computer screen, paper, or stone to brand, inform, illustrate, or entertain. Examples of graphics include photographs, drawings, line art, graphs, diagrams, typography, numbers, symbols, geometric designs, maps, engineering drawings, or other images. Graphics can combine text, illustration, and color. Graphic design can include deliberate selection, creation, or arrangement of typography alone, as in a brochure, flier, poster, web site, or book without any other element.

Computer graphics sometimes can refer to representation and manipulation of image data by a computer, various technologies that can be used to create and manipulate images, images that are produced, digital synthesizing and manipulating of visual content, and/or many other things. Computers and computer-generated images touch many aspects of daily life. Computer imagery is found on television, in newspapers, in weather reports, in medical investigation and surgical procedures, as well as many other areas. Many powerful tools have been developed to visualize data. Computer generated imagery can be categorized into several different types: 2D, 3D, and animated graphics. As technology has improved, 3D computer graphics have become more common, but 2D computer graphics are still widely used. Computer graphics has emerged as a sub-field of computer science which studies methods for digitally synthesizing and manipulating visual content. Over the past decade, other specialized fields have been developed like information visualization, and scientific visualization more concerned with "the visualization of three dimensional phenomena (architectural, meteorological, medical, biological, etc.), where the emphasis is on realistic renderings of volumes, surfaces, illumination sources, and so forth, perhaps with a dynamic (time) component."

Computer graphics typically include various visual textures. An ability to model such visual texture is important in any computer graphics modeling system. The advent of digital photography has made natural images an important source for textures. Numerous texture synthesis techniques have been developed to generate arbitrarily large textures to be mapped onto digital models. However, texture synthesis methods require an input image that contains a single texture, called an exemplar. Artists must often tediously transform or assist in transforming the relevant parts of a natural image to obtain an exemplar.

Some conventional systems have attempted to improve an existing exemplar. These systems include inverse texture synthesis systems that start with globally varying texture image and accompanying control map and produce a more compact exemplar. However, these systems do not extract an exemplar from an unconstrained natural image. Other known systems have dealt with extracting textures from images and removal of the effects of non-planar and affine transformed surfaces. However, such systems require a large amount of user input to locate the desired textures.

Thus, conventional techniques have not been able to succeed in obtaining texture exemplars with desired speed, simplicity and accuracy. As such, there is a need for better way for obtaining texture exemplars that is capable of automatically, quickly, and accurately extracting desired texture from an image based on a simple user's input.

SUMMARY

In some implementations, the current subject matter relates to a computer-implemented method. The method can be implemented to create and/or obtain texture exemplars from an image. The method includes receiving an image containing a plurality of pixels representing a plurality of textures, wherein each texture in the plurality of textures is configured to be selectable by a user, determining a desired texture in the plurality of textures contained within the image and defining a scale of the desired texture, generating a heat mapping of the image, wherein the heat mapping indicates location of the desired texture, generating, based on the heat mapping, a plurality of tiles corresponding to the defined scale of the desired texture, and generating an exemplar of desired texture. At least one of the receiving, the determining, the generating the heat mapping, the generating the plurality of tiles, and the generating the exemplar is performed on at least one processor.

In some implementations, the current subject matter can be configured to include at least one of the following optional features. The generating of the heat mapping can include selecting a node from a plurality of nodes contained within the desired texture, determining a distance between the selected node and at least another node in the plurality of nodes, and determining, based on the distance, propagation of heat within the heat mapping. The selected node can correspond to a location of heat within the heat mapping. The heat can be determined using $$h^{(t+1)}(x_i) = \frac{\sum_j W_{j,i} h^t(x_j)}{\sum_j W_{j,i}}$$

wherein $W_{j,i}$ is a weight between node i and node j in the plurality of nodes, and $h^t(x_i)$ is the heat at the node i at a time t.

The distance can be determined based on an amount of heat on the node j at the time t.

Each node in the plurality of nodes can be characterized by at least one of the following: a red value, a blue value, a green value of a pixel and variances of each of the red, blue, and green values, a statistical property, a mean, a standard deviation, a skew, and filter responses to at least one of a coarse adjustment of the defined scale and a fine adjustment of the defined scale.

The generating of the plurality of tiles can include performing a predetermined number of random walks among the plurality of nodes from the selected node to the at least another node, and determining whether the at least another node is located within the desired texture. The generating of the plurality of tiles can also include terminating the generating of the plurality of tiles when the predetermined number of random walks has been reached.

The selecting of the at least one tile can include generating a heat mapping of the selected tile, wherein the heat mapping indicates location of the desired texture in the selected tile, and generating, based on the heat mapping, a plurality of additional tiles corresponding to the desired texture.

The generating the exemplar can also include generating the exemplar using a Markov Random Field technique.

Defining of the scale of the desired texture can include selecting the scale from a plurality of scales. The plurality of scales can include at least one of the following a blurred image, an image containing a plurality of large averaged pixels, and an image having a smaller, lower resolution. The method can also include adjusting a variability of the at least one selected tile from the plurality of tiles by performing at least one of a coarse adjustment of the scale and a fine adjustment of the scale.

Each texture in the plurality of textures can include an array of a plurality of values, wherein each value is represented by a vector having a predetermined length. At least one of the receiving, the determining, the generating the heat mapping, the generating the plurality of tiles, the selecting, and the generating the exemplar can be performed on parallel processors.

The plurality of tiles can include at least one of the following: non-overlapping tiles and overlapping tiles. The selecting can include selecting a sample of tiles from the plurality of tiles.

In some implementations, the current subject matter a computer-implemented method. The method can be used to define a scale of an image. The method can include receiving an image, wherein the image is configured to include a plurality of pixels representing a plurality of textures within the image, wherein each texture in the plurality of textures is configured to be selectable by a user, generating a plurality of texture scales for selection by the user, selecting at least one texture scale from the plurality of texture scales, and generating, based on the selected texture scale, a texture in the plurality of textures of the image. The receiving, the generating the plurality of texture scales, the selecting, and the generating the texture in the plurality of textures is performed on at least one processor.

In some implementations, the current subject matter method for defining a scale of an image can include the following optional features. The generating of the plurality of texture scales can include generating the plurality of texture scales based on a blurred image configured to be obtained from the received image. The generating of the plurality of texture scales can include generating the plurality of texture scales based on an image configured to be obtained from the received image and further configured to contain a plurality of large averaged pixels. The generating of the plurality of texture scales can include generating the plurality of texture scales based on an image configured to be obtained from the received image and further configured to be a smaller, lower resolution image. The method can include using the selected texture scale for processing of an image.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to so-called "Graphics Processing Units (GPU).

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include one or more processors and a memory coupled to the processors. The memory can include one or more programs that cause the processors to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter provide methods, systems, articles or manufacture, and the like that can, among other possible advantages, provide systems and methods for providing systems, methods, and computer program products for generating texture exemplars from images.

Figure 1:
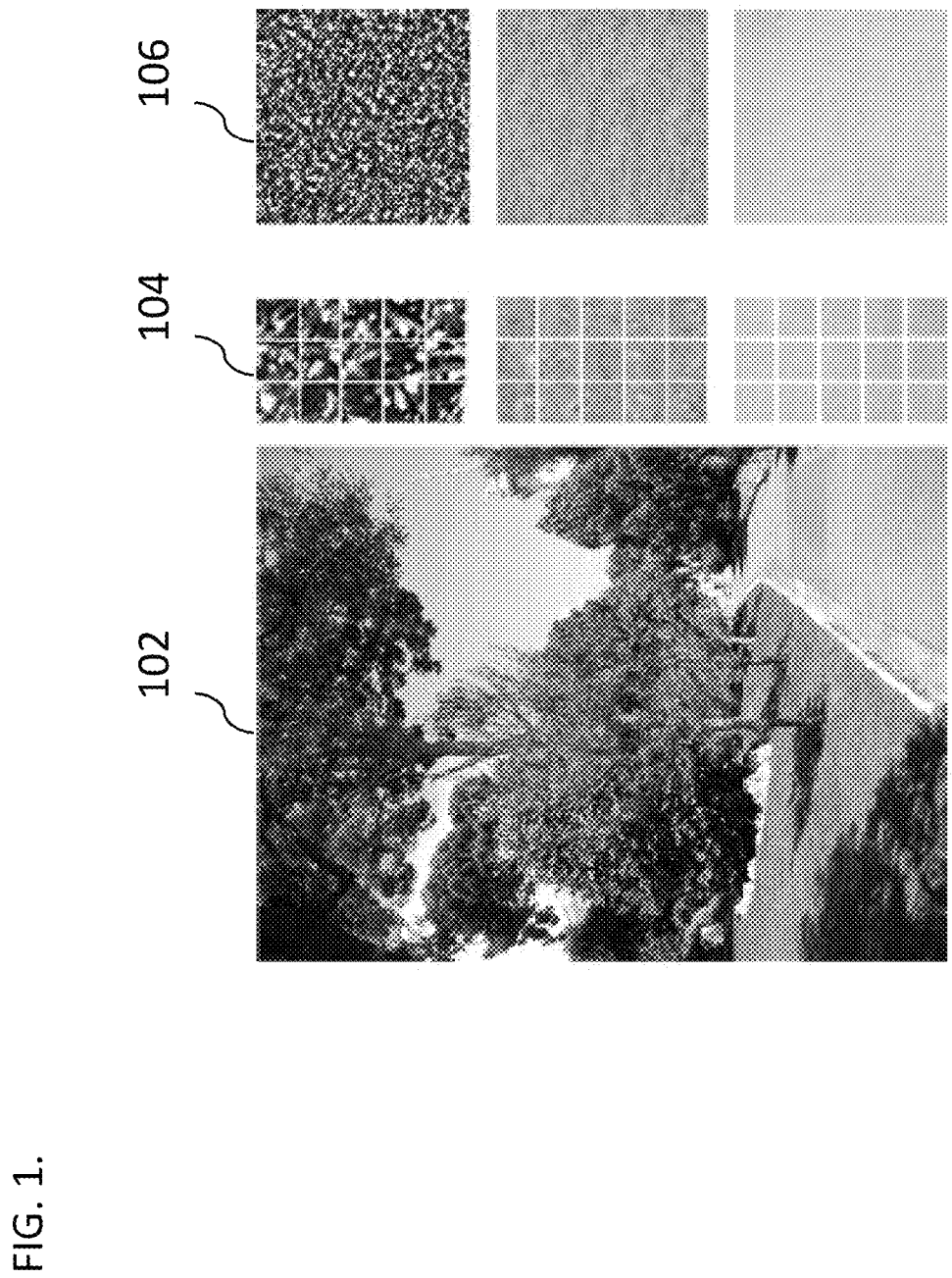
FIG. 1 illustrates an exemplary selection of textures from a source image, according to some implementations of the current subject matter.

FIG. 1 illustrates an exemplary image 102 and various texture exemplars 106 that can be obtained from various portions 104 of the image 102. Such portions 104 can represent locations of user-desired graphics or image textures. For example, the desired texture can be texture or color corresponding to grass, flowers, gravel, etc., as shown in the image 102.

In some implementations, the current subject matter can allow a user to extract a texture exemplar from a graphic or a source image using a simple user interface. The user can specify a scale of texture of interest within the source image. Once the texture scale is specified, the current subject matter can generate texture tiles interactively by allowing the user to click on any point in the source image. If desired, the set of tiles can be refined interactively by adjusting various parameters as described below. Then, a texture exemplar can be prepared using any available technique. One example of such technique can include a Markov random field ("MRF") based technique.

A MRF is a graphical model in which a set of random variables have a Markov property described by an undirected graph. Markov property refers to a memory-less property of a stochastic process. A stochastic process has a Markov property if a conditional probability distribution of future states of the process, given the present state and the past states, depends only upon the present state. This means that the past is irrelevant because it does not matter how the current state was obtained.

As stated above, to obtain an exemplar of texture from a graphic or a source image, the current subject matter can be configured to use a manifold formed based on a diffusion distance between two nodes in a graphic. A manifold is a topological space that on a small enough scale resembles a Euclidean space of a specific dimension. For example, a line and a circle are one-dimensional manifolds; a plane and sphere (the surface of a ball) are two-dimensional manifolds, and so on into high-dimensional space. To build a manifold quickly, the current subject matter may implement multiple levels of a Gaussian stack or pyramid. A Gaussian stack is a technique used in image processing that involves creation of a series of images which are weighted down using a Gaussian average ("Gaussian blur"). A Gaussian pyramid is a Gaussian stack where each level is and scaled down. When this technique is used multiple times, it creates a stack of successively smaller images, with each pixel containing a local average that corresponds to a pixel neighborhood on a lower level of the pyramid. The current subject matter may use a higher level of the Gaussian stack or pyramid to create an approximate manifold. Each node in the manifold contains the Red-Green-Blue ("RGB") colors of the pixel at a coarser level and variances of the RGB colors in the detailed corresponding tile. Other standard color spaces can be used as well, such as CIE XYZ, L*a*g, Luv, etc. Alternatively, the node can contain any one of a number of filter responses to both the coarser level and detailed corresponding level. Once the manifold is created, texture exemplars are formed by locating clusters in the diffusion distance manifold. Use of a diffusion distance can provide a robust measure for accounting of different paths between two nodes in a graphic and the distance along each path that "heat" (e.g., higher concentration of a desired texture or color) can use to progress from one point to another.

Figure 2:
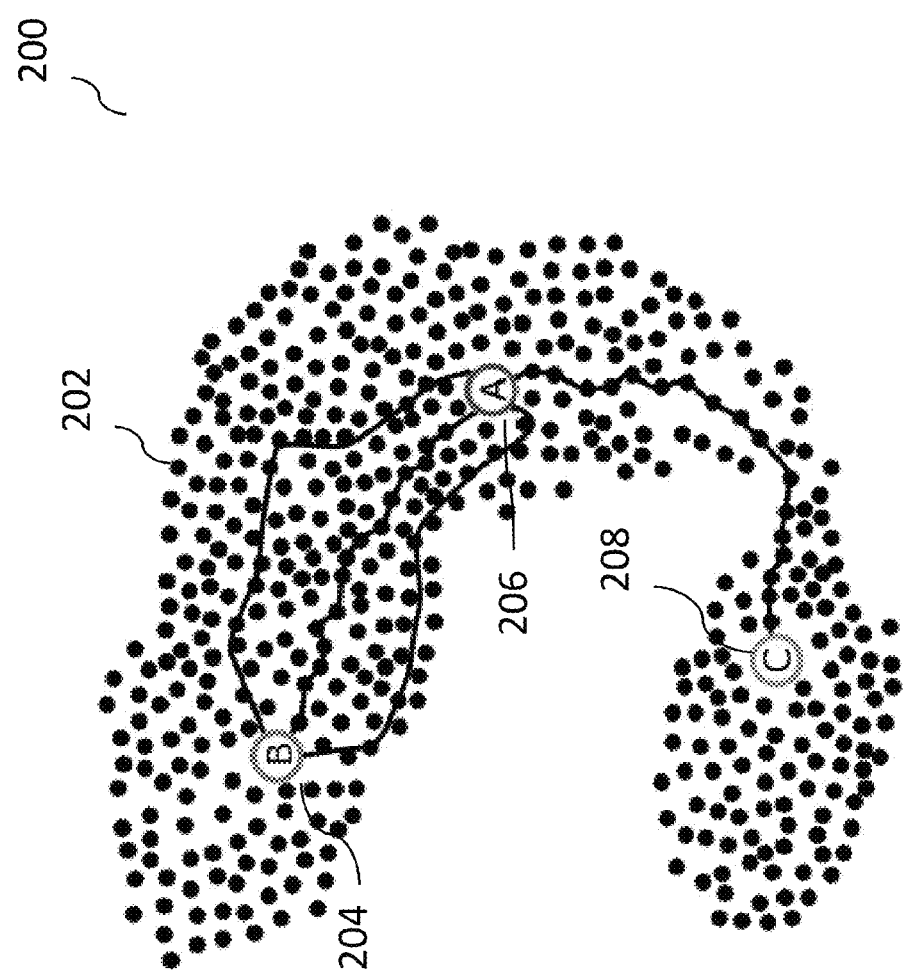
FIG. 2 illustrates an exemplary manifold, according to some implementations of the current subject matter.

Referring to FIG. 2, a manifold can be created by forming a weighted graph between nodes representing feature points (such as nodes 202). An edge is created between each pair of nodes and given a weight value represented by $$e^{-\|x_i - x_j\|^2 / \epsilon^2} \quad (1)$$

where $\|x_i - x_j\|$ is the Euclidean distance between the two feature points and $\epsilon$ is a constant. Alternatively, any one of a number of well known distance measures can be used in place of Euclidean distance. Furthermore, any function that decreases rapidly with distance could be used in place of $e^{-d}$.

In some implementations, $$\epsilon = \frac{c_{ave}}{f} \quad (2)$$

where f is a default value and $c_{ave}$ is the approximate average of the Euclidean distance of each node in the graph to its nearest neighbor. In some implementations, parameter f can have a default value of 0.5, which can work well for a variety of images. The parameter can be adjusted by the user to make coarse adjustments to the overall variability of the texture tiles selected by the method. The approximate average can be computed by averaging the result for a sampling of nodes. Each node 202 can be thought of as a location where "heat" (e.g., location of a higher concentration of a desired texture or color) can rest and the value of each edge can be thought of as the "conductance" of heat from one node to another. Each node also has an edge to itself with weight of 1.

FIG. 2 further illustrates a concept of a diffusion distance between nodes in an image. Each dot 202 represents a feature or a node in the source image. The geodesic distance within the shown manifold from point A 206 to point C 208 is shorter than the distance from point A 206 to point B 204. However, there exist more possible paths from point A 206 to point B 204 within the manifold than between points A and C, thereby making the diffusion distance from point A to point B shorter.

A diffusion distance can be measured by placing some units of "heat" at a starting node and allowing the heat to spread out. The heat spreads out across the edges, distributed proportionately to the weight of the edge. Thus, if $W_{i,j}$ is the weight between i and j and $h^t(x_i)$ is the heat at node i at time t, then the heat propagates using the following heat equation:

$$h^{(t+1)}(x_i) = \frac{\sum_j W_{j,i} h^t(x_j)}{\sum_j W_{j,i}} \quad (3)$$

where $h_i^t(x_j)$ is an amount of heat on node j at time t if the initial distribution consists of a single unit of heat at node i and can be defined as follow:

$$h_0^i(x_j) = \begin{cases} c & \text{if } i = j \\ 0 & \text{if } i \neq j \end{cases} \quad (4)$$

where c is a large constant. In some implementations, c can be set to 1000 in order to avoid errors due to the finite representation of numbers on a digital computer. Then, $h_i^t(x_j)$ can be applied by iterating the equation (3) t times on $h_i$. The diffusion distance on the manifold can be defined by:

$$d^t(i,j) = \Sigma_k (h_i^t(x_k) - h_j^t(x_k))^2 \quad (5)$$

The value of $h_i^t(x_j)$ can have several following properties. The amount of heat is conserved over all of the nodes in the image, i.e., the sum of all values $h_i^t(x_j)$ for each node is equal to c. This value can also be interpreted as proportional to the probability of heat being transported from a node i to a node k in t steps. Large values of $h_i^t(x_j)$ can indicate that the node k is "closer" to node i. Lastly, the values $h_i^t(x_j)$ can be visualized by arbitrary scaling of the values and embedding them in a grayscale image, otherwise referred to as a "heat map." Examples of heat maps are shown in FIGS. 6-9, as 604, 704, 804, and 904, respectively.

Figure 3:
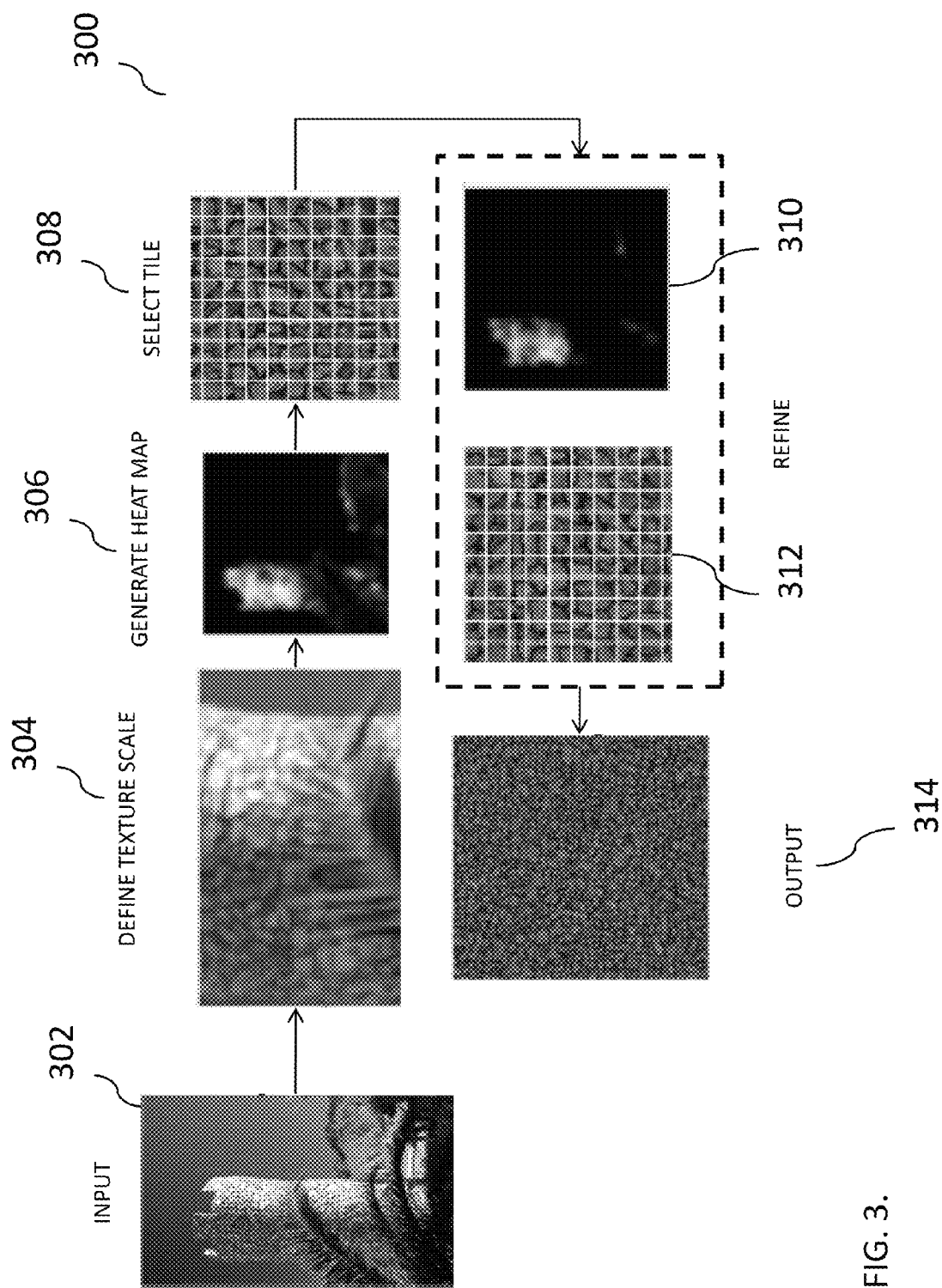
FIG. 3 illustrates an exemplary process for obtaining a texture exemplar, according to some implementations of the current subject matter.

FIG. 3 illustrates an exemplary way to generate texture exemplars from images. At 302, an input image is presented to a user. Then, a texture scale is defined, at 304. After defining a texture scale, a manifold is computed and an image location is selected by the user, at 306. The manifold can be computed for the entire image and/or a portion of the image. Once the image location is selected by the user, the texture tiles are generated and can be selected by the user, at 308. In some implementations, further refining operations in selection of image location and generation of further texture tiles can be performed, at 310 and 312, respectively. These operations can be performed to further narrow down the desired texture. Once the textures tiles are determined, the user can select a particular tile and an output exemplar can be generated for that particular texture, at 314. As stated above, generation of the exemplar can be performed using an MRF technique described above. The user can then store the generate texture exemplar and use it as desired. The following is a discussion of each of these operations.

An image frequently contains multiple textures at many spatial scales. A texture in the image can also contain textures of its own, making it difficult to obtain a desired texture. For example, a brick wall contains a texture that represents the wall pattern and each brick in that wall has a separate brick texture. The current subject matter can be configured to determine which texture and/or scale of texture that the user has selected. The user desiring to obtain a texture can select any desired texture, including common textures and/or unusual/uncommon textures.

Figure 4B:
FIG. 4a-4b illustrate an exemplary image and a scale of a texture, according to some implementations of the current subject matter.
Figure 4A:
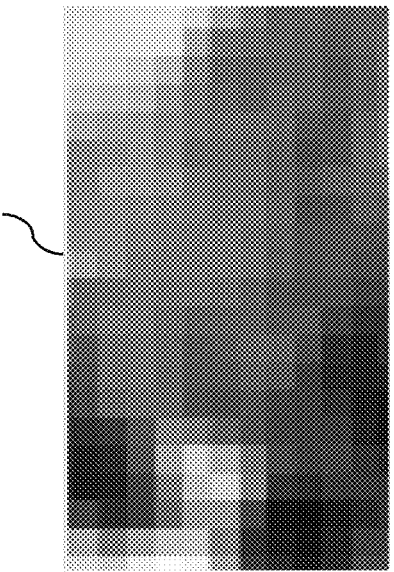

FIGS. 4a-b illustrate an exemplary way of determining the texture that the user may have selected. The user can be presented with an interface using which the user can select among different levels of granularity of an image from a less detailed in terms of desired texture and more detailed in terms of objects appearing in the image (as shown in FIG. 4a) to a more detailed in terms of desired texture and less detailed in terms of objects appearing in the image (as shown in FIG. 4b). The current subject matter can be configured to include different levels of detail among which the user can select a desired texture (as shown in FIGS. 5a-d). At the scale shown in FIG. 4b, the color of a pixel can represent a user-desired texture. In some implementations, further narrowing down to a more detailed image and exposing further texture in the image can be possible. In some implementations, the user can be presented with appropriate instructions (e.g., that can be displayed on a computer screen) on how to obtain the user-desired texture. A graphical component of a computing system (e.g., a graphics processing unit, a memory, RAM, ROM, processor, graphics/video card, graphics hardware, software, etc.) that the user may be using to obtain a desired texture can assist the user in performing these operations.

Figure 5C:
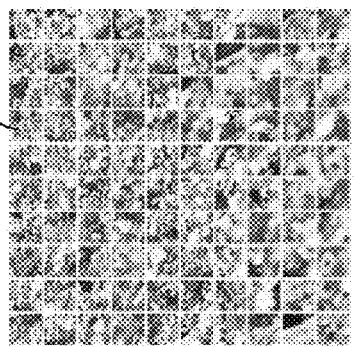
FIGS. 5a-5d illustrate an exemplary image and various scales of a texture, according to some implementations of the current subject matter.
Figure 5B:
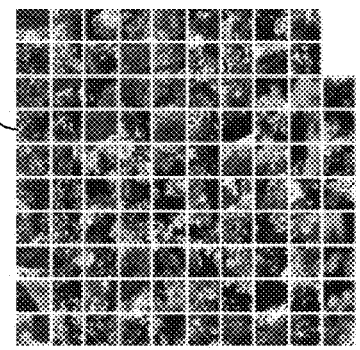
Figure 5D:
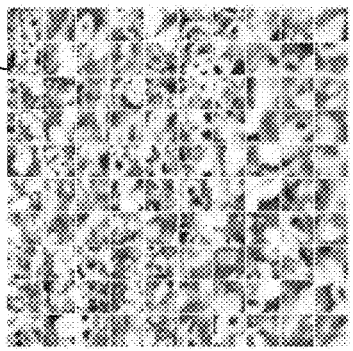
Figure 5A:
Figure 6:
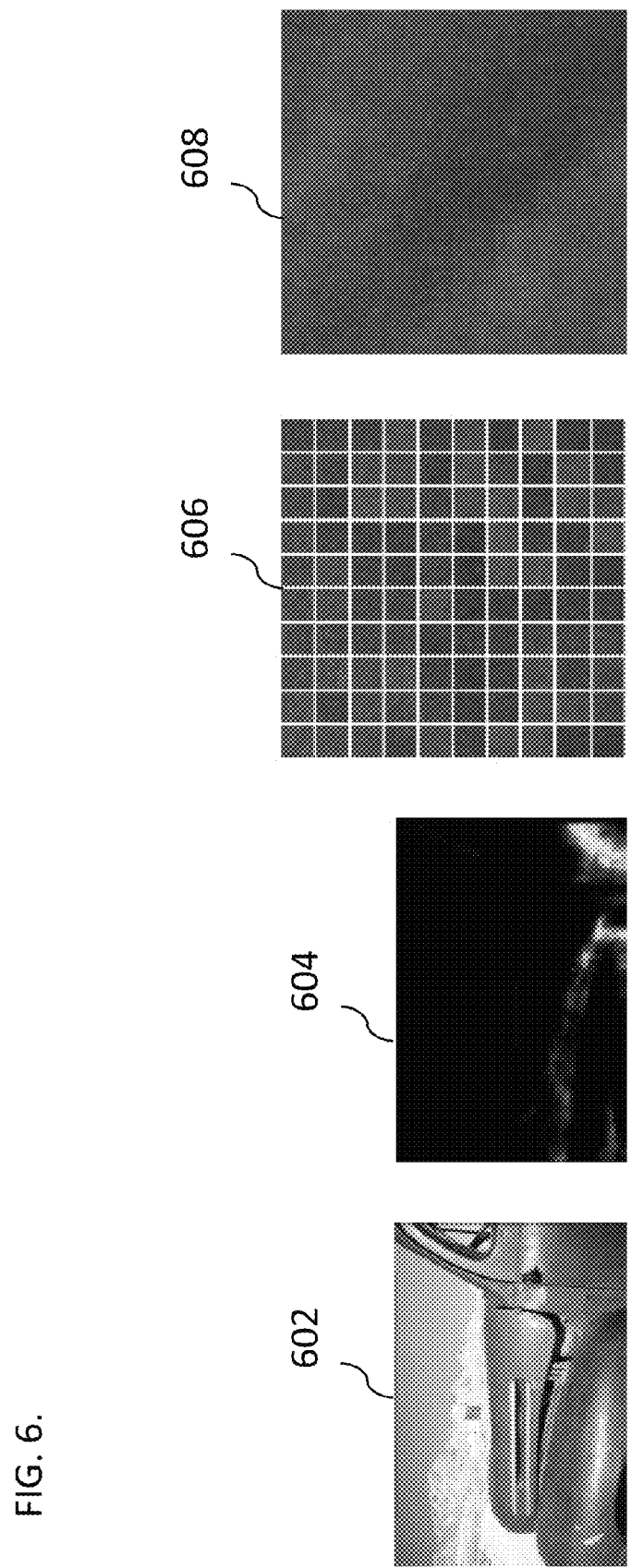
FIGS. 6-9, 10a and 10b, illustrate exemplary source images, heat maps, tiles, and texture exemplars, according to some implementations of the current subject matter.
Figure 7:
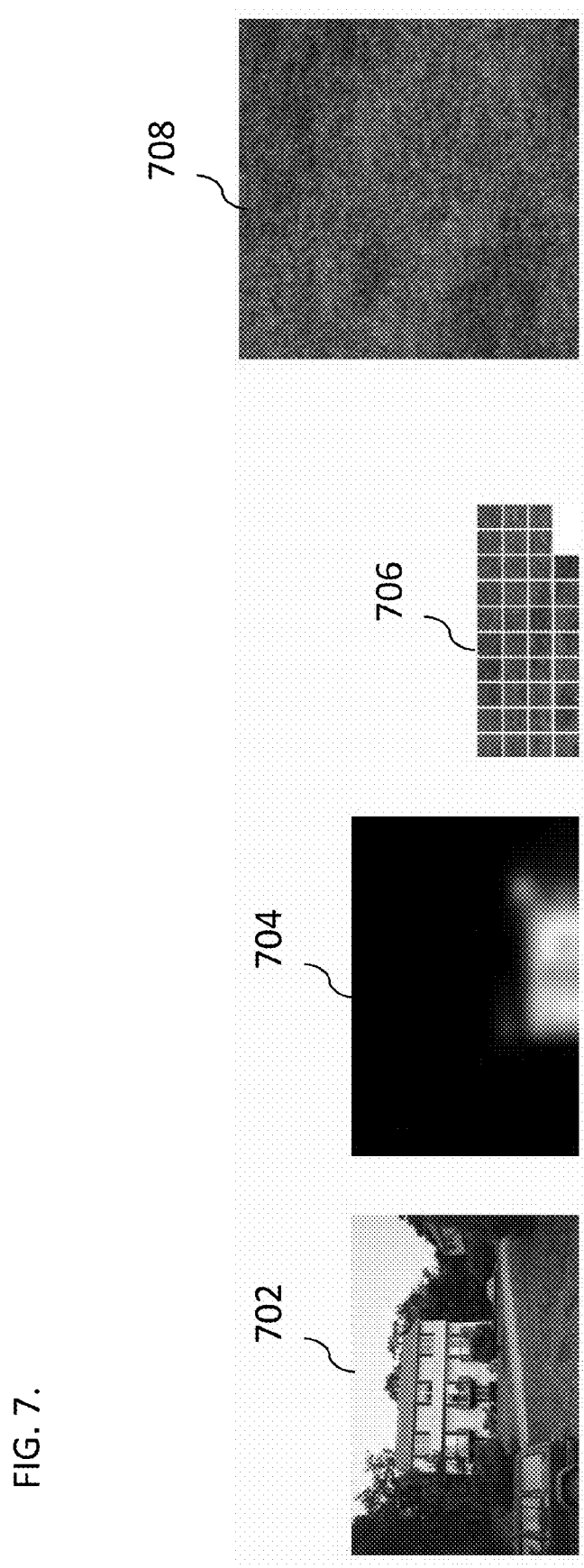
Figure 8:
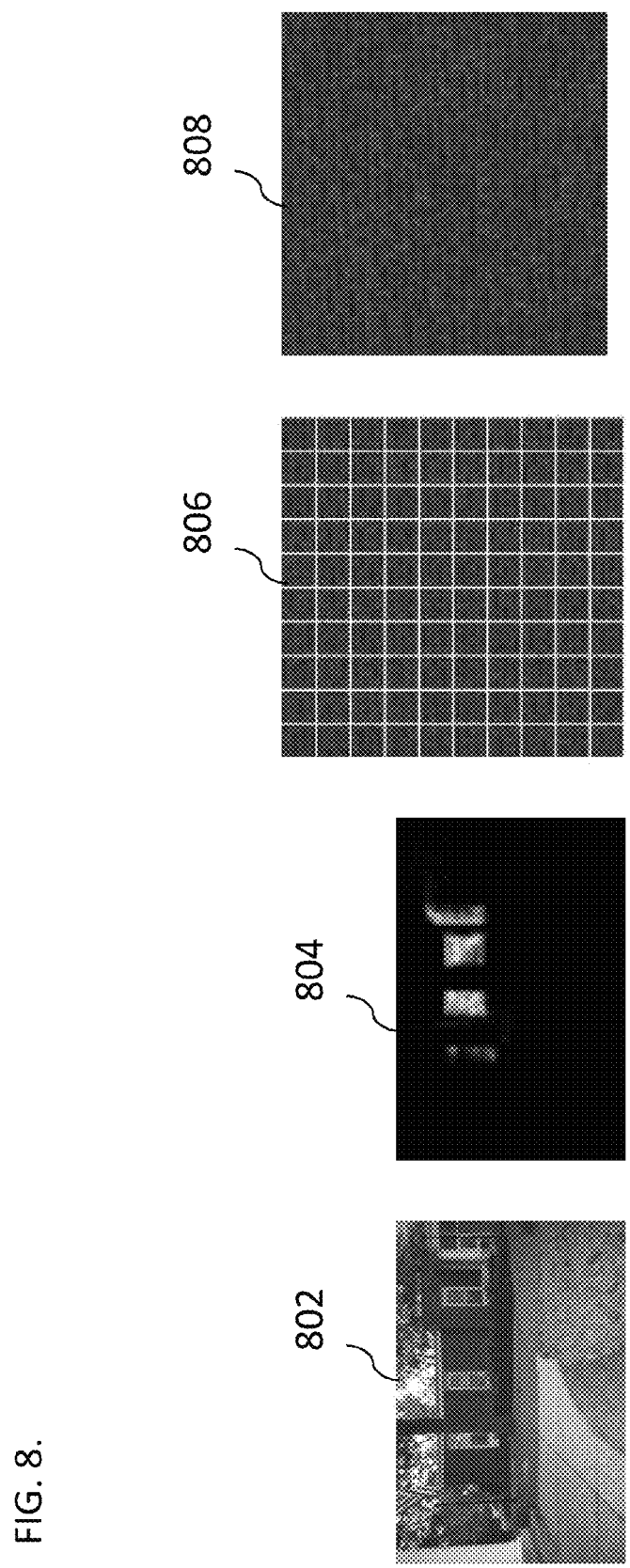
Figure 9:
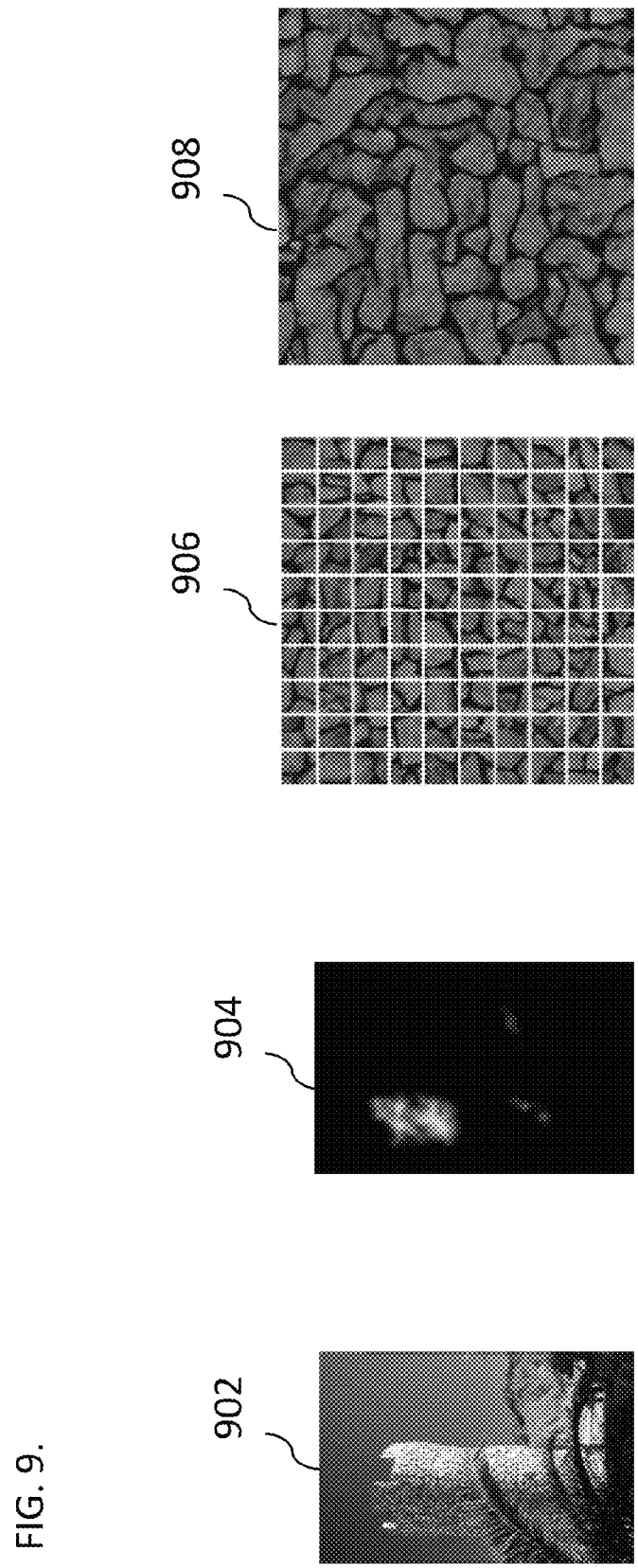

FIGS. 5a-d illustrate another exemplary texture selection process. In FIG. 5a, image 502 is a source image that contains a plurality of objects and an even greater plurality of color textures. FIG. 5b illustrates a plurality of tiles that focus on a particular object, e.g., a flower bush having leaves and flowers as represented by image 504. Further narrowing down can be performed resulting in a focus on just flowers, as shown by image 506 in FIG. 5c. Finally, the user can narrow the image even further focusing on just the petals of the flowers, as shown by image 508 in FIG. 5d. In some implementations, the user can be presented with an interface that contains a plurality of tiles (as shown in FIG. 5b), whereby the user can select (e.g., by clicking on) a particular tile or a group of tiles in the plurality of tiles that contain the desired color texture(s) and at that point a new interface can be generated illustrating just the selected tile(s), which can be further presented in the tiled format (as shown in FIG. 5c). This process can be repeated as many times as desired until the user selects a particular color/texture scale. In some implementations, users can be presented with a number of numeric parameters (e.g., parameters affecting coarseness and fineness of image/texture selection), such as f above and an option to change those parameters. In some implementations, a graphics-based tool, such as a slider or spinner control, can be used edit the numerical parameters and thereby affect selection of a particular image/texture in the overall image.

As stated above, once the desired color/texture scale is selected, a diffusion distance manifold can be determined. Each node in the manifold represents a texture patch or a tile. The representation of a texture tile is a vector having a size of n×n for a tile of n×n pixels. This results in n×n calculations that can be used for comparing all pairs of tiles to one another. Alternatively, the tiles can be characterized by a smaller vector to compute distances in the manifold. The manifold can be determined using nodes at the level of the Gaussian stack or pyramid selected by the user. In some implementations, each node in the manifold represents a texture tile, characterized by a vector of six features: RGB value of the pixel at the coarser level of the pyramid and variances of RGB values in the corresponding detailed tile. In some implementations, the node can be characterized by a vector containing any one of a number of statistical calculations or filter response from different levels. The edge between each pair of nodes is weighted by Equation (1). The manifold diffusion distance can then be calculated using Equation (5). Based on the calculated distance, a progress of heat can be determined and, hence, the desired texture can be located.

In some implementations, an Approximate Nearest Neighbor ("ANN") algorithm can be used to find a sub-graph that approximates the diffusion distance of the original manifold. In some implementations, in order to determine solutions for Equation (3), a fixed number of neighboring nodes k for each node can be selected. The value of k can be calculated by performing a random sampling and estimating how many edges are needed to keep the error below a given tolerance, in accordance with the following equation:

$$(fc_k)^2 > (fc_1)^2 + c_{ave}^2 \ln(2) \qquad (6)$$

where $c_i$ is the distance from the selected node to the $i^{th}$ neighbor; f is the constant discussed above with regard to Equation (2).

The manifold can be used to easily select texture tiles. When the user selects a point i within the image, heat mapping can be determined by calculating $h_i(x_j)$ for the entire manifold or a portion of the manifold. This can be done by setting the value of the node i to 1 and setting the value of the rest of the nodes to 0 and then iterating Equation (3). Each iteration can be calculated in parallel on a graphics processing unit ("GPU"), for a predetermined number of iterations t. In some implementations, the number of iterations can be in the range of from approximately 2 iterations to approximately 40 iterations.

Once the values of $h_i(x_j)$ are determined, tiles corresponding to the selected texture can be found by performing random walks from point i. The probability of the next node in each step of the walk from the node j to node k can be given by the value of $W_{j,t}h_i(x_j)$. A node (corresponding to a tile) can be selected after a predetermined number of steps (e.g., 100 steps). This process continues for a predetermined number of random walks or until a pre-selected number of random walks has ended in the previously selected tiles. The number of steps and walks can be arbitrary, but can be preset as constants. In some implementations, the walks can be driven by following steps having high values of $W_{j,i}h_i(x_j)$, where all of the tiles in the path have a similar desired texture.

When the texture tiles are identified, the set of selected tiles can be displayed to the user. In some implementations, the user can further narrow down to the get an even more particular texture. This can be done to remove some unwanted feature or to get a more refined texture. To do so, the set can be adjusted by adjusting the value of t used in iterating the Equation (3) and the value of f that determines weights of the edges. Each of these parameters can control the diffusion of the heat values. The system can be configured to generate updated results quickly and the user can simply adjust parameters as desired. The updating of selected tiles for a change in the value t can be computed most rapidly and can be considered a "fine tuning parameter." The value of f can be a coarser level tuning parameter. Once identification of texture tiles and/or refinement of tiles is performed, any MRF texture synthesis methods can then be used to produce a texture exemplar from the tiles identified.

EXAMPLE

The following example and accompanying Figures, illustrate application of the techniques discussed above as conducted by the inventors of the current subject matter. In this example, pixels in the image were represented as floating point values between 0 and 1. OpenCV (as described in Bradski, G. et al., "Learning OpenCV: Computer vision with the OpenCV library," O'Reilly Media, 2008) was used to create the Gaussian pyramid for the image. A user-selected scale was used to select the level used for creating a manifold. For each node, a 6-tuple was added into the manifold, in the form of:

$$(2U_b, 2U_g, 2U_r, \sigma(L_b), \sigma(L_g), \sigma(L_r)) \qquad (7)$$

where $U_r$, $U_g$, $U_b$ are the red, green and blue components of the upper level, and $\sigma(L_r)$, $\sigma(L_g)$, $\sigma(L_b)$ are the standard deviation of the red, green and blue components of the lower level tile. RGB are standard designations of colors red, green, and blue. Other standard color spaces can be used as well, such as CIE XYZ, L*a*b, Luv, etc. In the embodiments discussed above, an average (i.e., U) and standard deviations are used to represent the nodes. However, additional or substitute quantities from the lower level (e.g., the result of applying Gabor filters to the tiles) can also be used. Once all the tuples were calculated, approximate nearest neighbors were determined using the FLANN library (as described in Muja, M., "Flann, fast library for approximate nearest neighbors, 2009).

The solution to Equation (3) was implemented on a GPU using CUDA (as described in Garland, M., et al., "Parallel computing experiences with CUDA," Micro, IEEE 28, 4 (2008), 13-27) and the manifold was cloned in the GPU memory. The in and out edges in a matrix were stored. Time was saved by normalizing the weights of each node before the calculation, which led to a directed graph where the edge from i to j may have a different value of j to i. To save memory, at most only the largest valued 128 edges were used. All steps to this point were performed before the user selected a location in the image. The user just needed to double click on one pixel that represented the desired texture. The system then initialized the node corresponding to that point to 1000.0 and the rest of the points to a value of 0.0. A CUDA kernel was used to iterate Equation (3). The value of $h^t_i$ for each node was stored in a texture array. The weight of each outer edge and the destination indexes were stored in two 2D arrays. Each node corresponded to one row in the array, with a length equal to the maximum number of edges for any node. The kernel then calculated the sum in 1 and store $h^{t+1}_i$ in an array.

To generate a texture exemplar, a basic image quilting technique was used (an example of it is shown in Efros, A. A., et al., "Image quilting for texture synthesis and transfer," In Proceedings of the 28$^{th}$ Annual Conference on Computer Graphics and Interactive Techniques, (New York, N.Y., USA 2001), SIGGRAPH '01, ACM, pp. 341-346). To test the efficiency of the current subject matter's algorithm, an image on the order of 5 MegaPixels was analyzed and an upper level with 19,200 pixels each representing a 16 square pixel tile was selected. The resulting manifold used 123 ANN, when f=0.5. In the above experiment, a consumer laptop, a Sony VPCCW27FX with an Intel i5 M520 processor and Nvidia GeForce GT 330M was used. The exemplar tiles between 2 to 5 seconds of preprocessing time to create. The efficiency of the each stage in the algorithm was also tested by analyzing an image on the order of 10 MegaPixels and choosing an upper level with 10,086 pixels each representing a 32 square pixel tile. The resulting manifold used 127 ANN, when f=0.5. Manifolds were created in 2.5 seconds and ran 49 iterations in 0.24 seconds. It took approximately 141.8 milliseconds to iterate Equation (3). These results indicate that the current subject matter algorithm can be used for interactive tools, allowing users to sample many different possible textures.

As demonstrated in FIGS. 6-9 the implementation of the current subject matter worked well for many different textures. Each figure includes an original image (shown as 602, 702, 802, 902, respectively), a heat map for that image (shown as 604, 704, 804, 904), tiles (shown as 606, 706, 806, 906), and the generated texture exemplar (shown as 608, 708, 808, 908). These figures illustrate various types of textures—a general grey noise pattern, grass with individual blades that are visible, a structured brick pattern, and a pattern of relatively large elements. These patterns were obtained from images having a size ranging from 1.6 to 10.2 megapixels.

In some implementations, the diffusion distance manifolds can be used at interactive rates to distinguish textures in arbitrary images or to generate texture exemplars for texture synthesis algorithms. The method can be non-local and able to accumulate information from a large number of image regions. In some implementations, patches from multiple images can be combined for the purposes of obtaining exemplars.

Figure 10B:
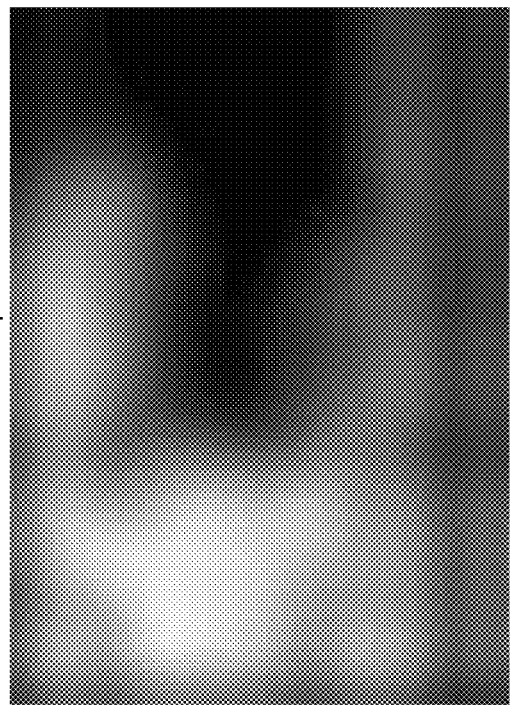
Figure 10A:
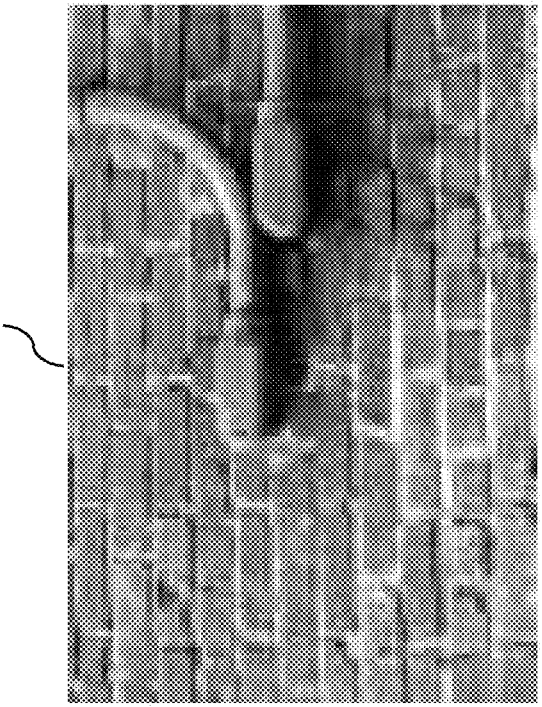
Figure 11A:
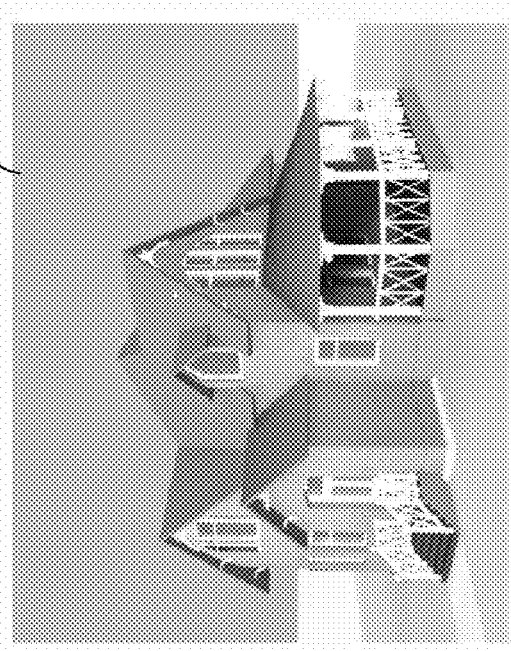
FIGS. 11a-11d illustrate exemplary 3D renderings, both without textures, and with the addition of textures generated according to some implementations of the current subject matter.
Figure 11B:
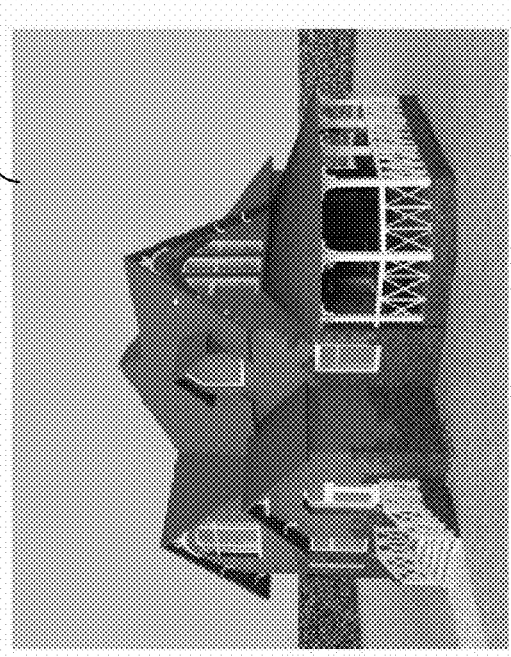
Figure 11C:
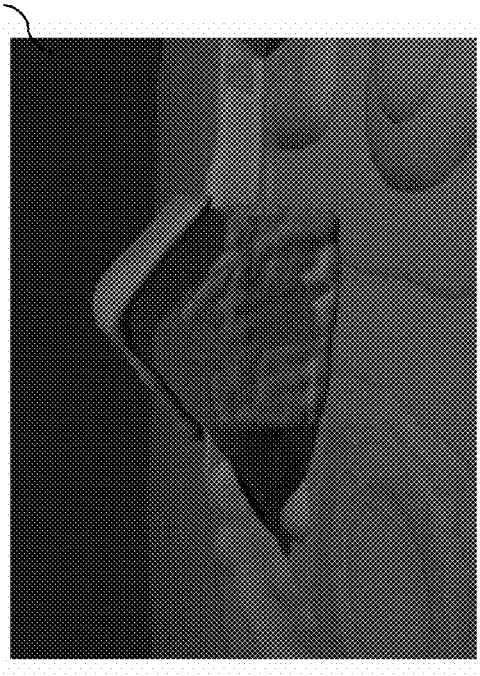
Figure 11D:
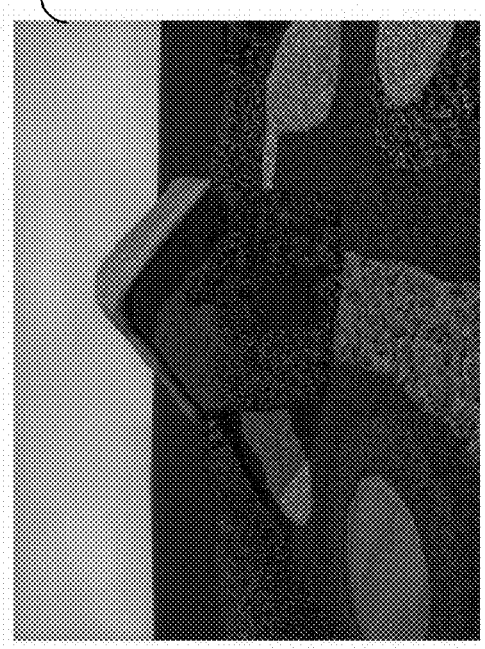

FIGS. 10*a*-10*b* illustrate additional examples of obtaining textures from source images. In this example, the original image 1002 contains 11,750 pixels. It took approximately 3 seconds to obtain a texture exemplar from the image. FIGS. 11*a* and 11*c* illustrate exemplary 3D renderings that do not contain textures. FIGS. 11*b* and 11*d* illustrate the same 3D renderings with textures from the algorithm being added. These figures were created by off-the-shelf software (e.g., Cinemax4D and Maya), using the textures created according to some implementations of the current subject matter.

Figure 12:
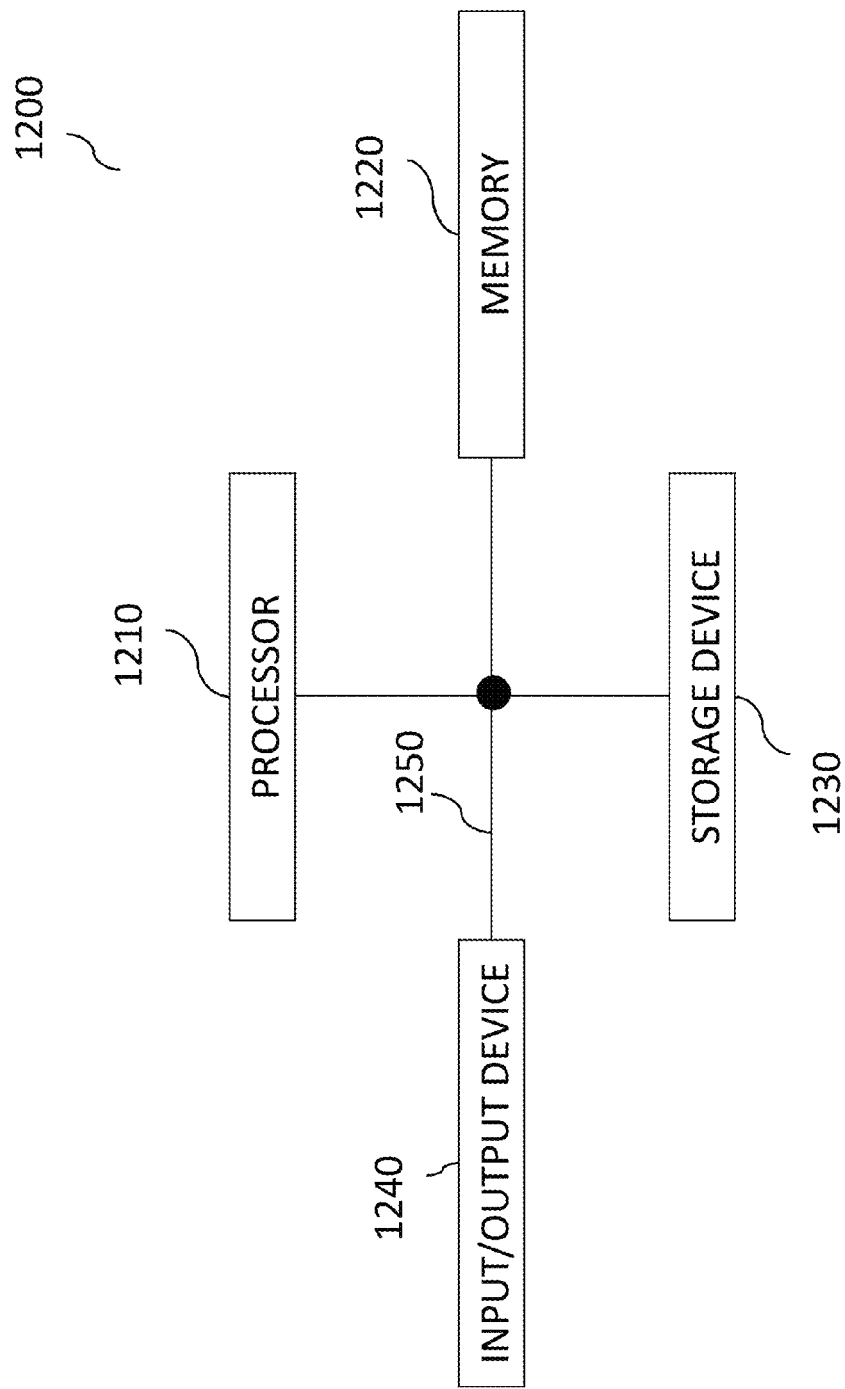
FIG. 12 illustrates an exemplary system, according to some implementations of the current subject matter.

In some implementations, the current subject matter can be configured to be implemented in a system 1200, as shown in FIG. 12. The system 1200 can include a processor 1210, a memory 1220, a storage device 1230, and an input/output device 1240. Each of the components 1210, 1220, 1230 and 1240 can be interconnected using a system bus 1250. The processor 1210 can be configured to process instructions for execution within the system 1200. In some implementations, the processor 1210 can be a single-threaded processor. In alternate implementations, the processor 1210 can be a multithreaded processor. The processor 1210 can be further configured to process instructions stored in the memory 1220 or on the storage device 1230, including receiving or sending information through the input/output device 1240. The memory 1220 can store information within the system 1200. In some implementations, the memory 1220 can be a computer-readable medium. In alternate implementations, the memory 1220 can be a volatile memory unit. In yet some implementations, the memory 1220 can be a non-volatile memory unit. The storage device 1230 can be capable of providing mass storage for the system 1200. In some implementations, the storage device 1230 can be a computer-readable medium. In alternate implementations, the storage device 1230 can be a floppy disk device, a hard disk device, an optical disk device, a tape device, non-volatile solid state memory, or any other type of storage device. The input/output device 1240 can be configured to provide input/output operations for the system 1200. In some implementations, the input/output device 1240 can include a keyboard and/or pointing device. In alternate implementations, the input/output device 1240 can include a display unit for displaying graphical user interfaces. The system can also contain a graphical processing unit.

Figure 13:
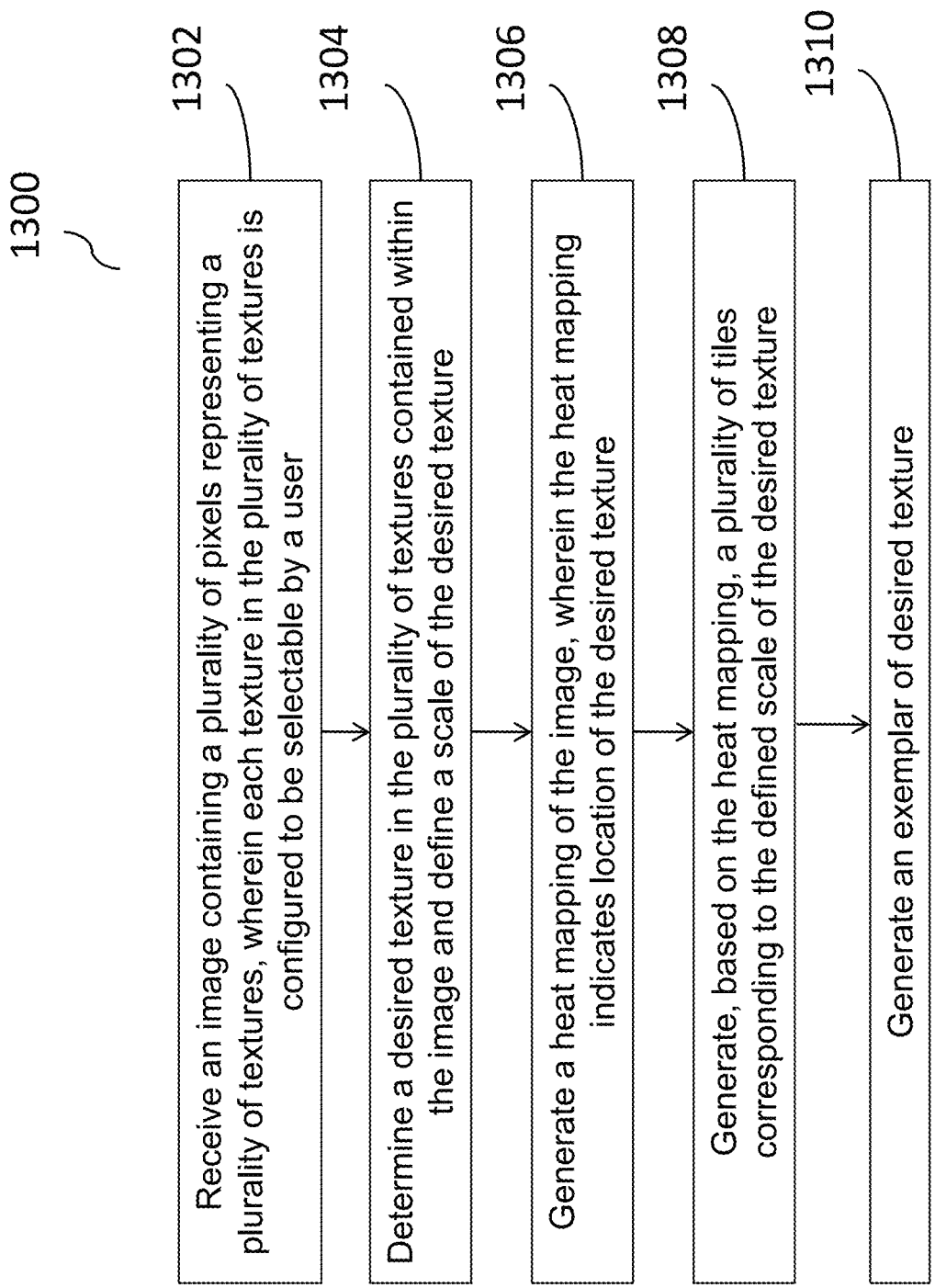
FIG. 13 illustrates an exemplary method, according to some implementations of implementations of the current subject matter.

FIG. 13 illustrates an exemplary method 1300, according to some implementations of the current subject matter. At 1302, an image containing a plurality of pixels representing a plurality of textures can be received. Each texture in the plurality of textures can be configured to be selectable by a user. At 1304, a desired texture in the plurality of textures contained within the image can be determined and a scale of the desired texture can be defined. At 1306, a heat mapping of the image can be generated. The heat mapping can indicate location of the desired texture. At 1308, a plurality of tiles corresponding to the defined scale of the desired texture can be generated based on the heat mapping. At 1310, an exemplar of desired texture can be generated. At least one of the receiving, the determining, the generating the heat mapping, the generating the plurality of tiles, the selecting, and the generating the exemplar is performed on at least one processor.

In some implementations, the current subject matter can be configured to include the following optional features. The generating the heat mapping can include selecting a node from a plurality of nodes contained within the desired texture, determining a distance between the selected node and at least another node in the plurality of nodes, and determining, based on the distance, propagation of heat within the heat mapping. The selected node can correspond to a location of heat within the heat mapping. The heat can be determined using Equation (3). The distance can be determined based on an amount of heat on the node at a particular time and/or using Equation (5). Each node in the plurality of nodes can be characterized by at least one of the following: a red value, a blue value, a green value of a pixel and variances of each of the red, blue, and green values, a statistical property (for example, mean, standard deviation, skew, etc.), and filter responses to at least one of a coarse adjustment of the defined scale and a fine adjustment of the defined scale (e.g., this can be used to differentiate the same texture at different orientations). The generating of the plurality of tiles can include performing a predetermined number of random walks among the plurality of nodes from the selected node to the at least another node and determining whether the at least another node is located within the desired texture. The generating of the plurality of tiles can include terminating the generating of the plurality of tiles when the predetermined number of random walks has been reached. The selecting the at least one tile can include generating a heat mapping of the selected tile, wherein the heat mapping can indicate location of the desired texture in the selected tile and generating, based on the heat mapping, a plurality of additional tiles corresponding to the desired texture. The generating of the exemplar can include generating the exemplar using a Markov Random Field technique. The defining of the scale of the desired texture can include selecting the scale from a plurality of scales. The plurality of scales can include at least one of the following a blurred image, an image containing a plurality of large averaged pixels (as shown in FIG. 4b, reference numeral 404), and an image having a smaller, lower resolution. The method can further include adjusting a variability of the at least one selected tile from the plurality of tiles by performing at least one of a coarse adjustment of the scale and a fine adjustment of the scale (e.g., by selecting alternate values of f and t). Each texture in the plurality of textures can include an array of a plurality of values, wherein each value is represented by a vector having a predetermined length (e.g., the vector can include values RGB, spectral values, temporal values, and/or any other values, and/or any combination thereof). At least one of the receiving, the determining, the generating the heat mapping, the generating the plurality of tiles, the selecting, and the generating the exemplar can be performed on parallel processors. The plurality of tiles can include at least one of the following: non-overlapping tiles and overlapping tiles. Selection of at least one tile in the plurality of tiles can include selecting a sample of tiles from the plurality of tiles.

Figure 14:
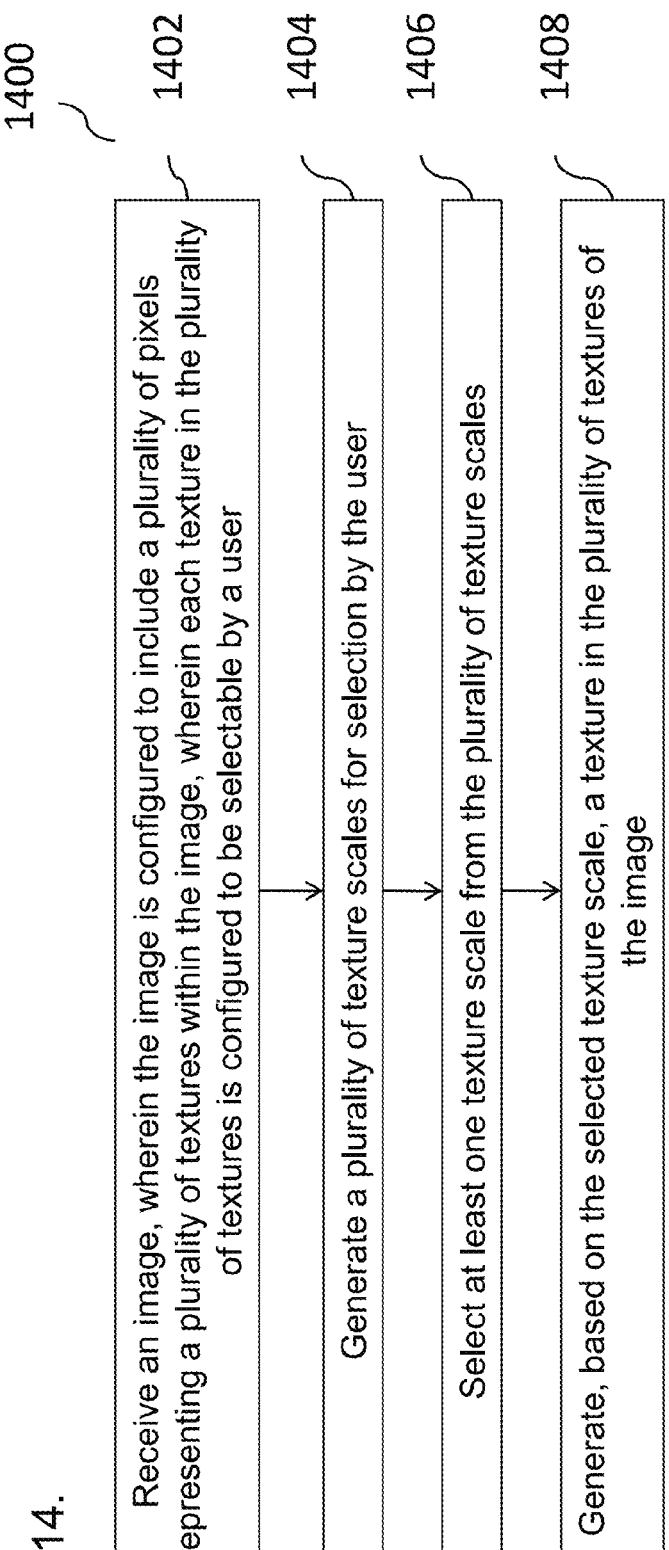
FIG. 14 illustrates an exemplary method for selecting a scale of an image, according to some implementations of the current subject matter.

FIG. 14 is a flow chart illustrating an exemplary method 1400 for defining a scale of an image, according to some implementations of the current subject matter. At 1402, an image can be received. The image can be configured to include a plurality of pixels representing a plurality of textures within the image, wherein each texture in the plurality of textures can be configured to be selectable by a user. At 1404, a plurality of texture scales for selection by the user can be generated. At 1406, at least one texture scale can be selected from the plurality of texture scales. At 1408, a texture in the plurality of textures of the image can be generated based on the selected texture scale.

In some implementations, the current subject matter method for defining a scale of an image can include the following optional features. The generating of the plurality of texture scales can include generating the plurality of texture scales based on a blurred image configured to be obtained from the received image. The generating of the plurality of texture scales can include generating the plurality of texture scales based on an image configured to be obtained from the received image and further configured to contain a plurality of large averaged pixels (such as image 404 shown in FIG. 4b). The generating of the plurality of texture scales can include generating the plurality of texture scales based on an image configured to be obtained from the received image and further configured to be a smaller, lower resolution image. The method can include using the selected texture scale for processing of an image. Such processing can include but is not limited to determination of an image scale that can be used for computing an average pixel value in a region to adjust pixel values in a tone mapping algorithm. Other processing uses can be implemented as well.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:
1. A computer-implemented method, comprising:
receiving an image containing a plurality of pixels representing a plurality of textures, wherein each texture in the plurality of textures is configured to be selectable by a user;
determining a desired texture in the plurality of textures contained within the image and defining a scale of the desired texture;
generating a heat mapping of the image, wherein the heat mapping indicates location of the desired texture at a predetermined time, wherein generating the heat mapping further includes selecting a node from a plurality of nodes contained within the desired texture;
determining a distance between the selected node and at least another node in the plurality of nodes; and
determining, based on the distance, propagation of heat within the heat mapping;
wherein the selected node corresponds to a location of heat within the heat mapping;
wherein the heat is determined using $$h^{(t+1)}(x_i) = \frac{\sum_j W_{j,i} h^t(x_j)}{\sum_j W_{j,i}}$$

wherein $W_{j,i}$ is a weight between node i and node j in the plurality of nodes, and $h^t(x_i)$ is the heat at the node i at a time t;
generating, based on the heat mapping, a plurality of tiles corresponding to the defined scale of the desired texture; and
generating an exemplar of desired texture;
wherein at least one of the receiving, the determining, the generating the heat mapping, the generating the plurality of tiles, and the generating the exemplar is performed on at least one processor.

2. The method according to claim 1, wherein the distance is determined based on an amount of heat on the node j at the time t.

3. The method according to claim 1, wherein each node in the plurality of nodes is characterized by at least one of the following: a red value, a blue value, a green value of a pixel and variances of each of the red, blue, and green values, a statistical property, a mean, a standard deviation, a skew, and filter responses to at least one of a coarse adjustment of the defined scale and a fine adjustment of the defined scale.

4. The method according to claim 1, wherein the generating of the plurality of tiles comprises performing a predetermined number of random walks among the plurality of nodes from the selected node to the at least another node; and determining whether the at least another node is located within the desired texture.

5. The method according to claim 4, wherein the generating of the plurality of tiles further comprises
terminating the generating of the plurality of tiles when the predetermined number of random walks has been reached.

6. The method according to claim 1, wherein the selecting the at least one tile comprises generating a heat mapping of the selected tile, wherein the heat mapping indicates location of the desired texture in the selected tile; and generating, based on the heat mapping, a plurality of additional tiles corresponding to the desired texture.

7. The method according to claim 1, wherein the generating the exemplar further comprises generating the exemplar using a Markov Random Field technique.

8. The method according to claim 1, wherein the defining the scale of the desired texture includes selecting the scale from a plurality of scales.

9. The method according to claim 8, wherein the plurality of scales includes at least one of the following a blurred image, an image containing a plurality of large averaged pixels, and an image having a smaller, lower resolution.

10. The method according to claim 8, further comprising adjusting a variability of the at least one selected tile from the plurality of tiles by performing at least one of a coarse adjustment of the scale and a fine adjustment of the scale.

11. The method according to claim 1, wherein each texture in the plurality of textures includes an array of a plurality of values, wherein each value is represented by a vector having a predetermined length.

12. The method according to claim 1, wherein at least one of the receiving, the determining, the generating the heat mapping, the generating the plurality of tiles, the selecting, and the generating the exemplar is performed on parallel processors.

13. The method according to claim 1, wherein the plurality of tiles includes at least one of the following: non-overlapping tiles and overlapping tiles.

14. The method according to claim 1, wherein the selecting further comprises
selecting a sample of tiles from the plurality of tiles.

15. A computer program product comprising a non-transitory machine-readable medium storing instructions that, when executed by at least one programmable processor, cause the at least one programmable processor to perform operations comprising:
receiving an image containing a plurality of pixels representing a plurality of textures, wherein each texture in the plurality of textures is configured to be selectable by a user;
determining a desired texture in the plurality of textures contained within the image and defining a scale of the desired texture;
generating a heat mapping of the image, wherein the heat mapping indicates location of the desired texture at a predetermined time, wherein generating the heat mapping further includes
selecting a node from a plurality of nodes contained within the desired texture;
determining a distance between the selected node and at least another node in the plurality of nodes; and
determining, based on the distance, propagation of heat within the heat mapping;
wherein the selected node corresponds to a location of heat within the heat mapping;
wherein the heat is determined using $$h^{(t+1)}(x_i) = \frac{\sum_j W_{j,i} h^t(x_j)}{\sum_j W_{j,i}}$$

wherein $W_{j,i}$ is a weight between node i and node j in the plurality of nodes, and $h^t(x_i)$ is the heat at the node i at a time t;
generating, based on the heat mapping, a plurality of tiles corresponding to the defined scale of the desired texture; and
generating an exemplar of desired texture.

16. The computer program product according to claim 15, wherein the distance is determined based on an amount of heat on the node j at the time t.

17. The computer program product according to claim 15, wherein each node in the plurality of nodes is characterized by at least one of the following: a red value, a blue value, a green value of a pixel and variances of each of the red, blue, and green values, a statistical property, a mean, a standard deviation, a skew, and filter responses to at least one of a coarse adjustment of the defined scale and a fine adjustment of the defined scale.

18. The computer program product according to claim 15, wherein the generating of the plurality of tiles comprises performing a predetermined number of random walks among the plurality of nodes from the selected node to the at least another node; and determining whether the at least another node is located within the desired texture.

19. The computer program product according to claim 18, wherein the generating of the plurality of tiles further comprises
terminating the generating of the plurality of tiles when the predetermined number of random walks has been reached.

20. The computer program product according to claim 15, wherein the selecting the at least one tile comprises generating a heat mapping of the selected tile, wherein the heat mapping indicates location of the desired texture in the selected tile; and generating, based on the heat mapping, a plurality of additional tiles corresponding to the desired texture.

21. The computer program product according to claim 15, wherein the generating the exemplar further comprises generating the exemplar using a Markov Random Field technique.

22. The computer program product according to claim 15, wherein the defining the scale of the desired texture includes selecting the scale from a plurality of scales.

23. The computer program product according to claim 22, wherein the plurality of scales includes at least one of the following a blurred image, an image containing a plurality of large averaged pixels, and an image having a smaller, lower resolution.

24. The computer program product according to claim 22, further comprising
adjusting a variability of the at least one selected tile from the plurality of tiles by performing at least one of a coarse adjustment of the scale and a fine adjustment of the scale.

25. The computer program product according to claim 15, wherein each texture in the plurality of textures includes an array of a plurality of values, wherein each value is represented by a vector having a predetermined length.

26. The computer program product according to claim 15, wherein at least one of the receiving, the determining, the generating the heat mapping, the generating the plurality of tiles, the selecting, and the generating the exemplar is performed on parallel processors.

27. The computer program product according to claim 15, wherein the plurality of tiles includes at least one of the following: non-overlapping tiles and overlapping tiles.

28. The computer program product according to claim 15, wherein the selecting further comprises selecting a sample of tiles from the plurality of tiles.

29. A system comprising:
at least one programmable processor; and
a machine-readable medium storing instructions that, when executed by the at least one programmable processor, cause the at least one programmable processor to perform operations comprising:
receiving an image containing a plurality of pixels representing a plurality of textures, wherein each texture in the plurality of textures is configured to be selectable by a user;
determining a desired texture in the plurality of textures contained within the image and defining a scale of the desired texture;
generating a heat mapping of the image, wherein the heat mapping indicates location of the desired texture at a predetermined time, wherein generating the heat mapping further includes
selecting a node from a plurality of nodes contained within the desired texture;
determining a distance between the selected node and at least another node in the plurality of nodes; and
determining, based on the distance, propagation of heat within the heat mapping;
wherein the selected node corresponds to a location of heat within the heat mapping;
wherein the heat is determined using $$h^{(t+1)}(x_i) = \frac{\sum_j W_{j,i} h^t(x_j)}{\sum_j W_{j,i}}$$

wherein $W_{j,i}$ is a weight between node i and node j in the plurality of nodes, and $h^t(x_i)$ is the heat at the node i at a time t;
generating, based on the heat mapping, a plurality of tiles corresponding to the defined scale of the desired texture; and
generating an exemplar of desired texture.

30. The system according to claim 29, wherein the distance is determined based on an amount of heat on the node j at the time t.

31. The system according to claim 29, wherein each node in the plurality of nodes is characterized by at least one of the following: a red value, a blue value, a green value of a pixel and variances of each of the red, blue, and green values, a statistical property, a mean, a standard deviation, a skew, and filter responses to at least one of a coarse adjustment of the defined scale and a fine adjustment of the defined scale.

32. The system according to claim 29, wherein the generating of the plurality of tiles comprises performing a predetermined number of random walks among the plurality of nodes from the selected node to the at least another node; and determining whether the at least another node is located within the desired texture.

33. The system according to claim 32, wherein the generating of the plurality of tiles further comprises
terminating the generating of the plurality of tiles when the predetermined number of random walks has been reached.

34. The system according to claim 29, wherein the selecting the at least one tile comprises generating a heat mapping of the selected tile, wherein the heat mapping indicates location of the desired texture in the selected tile; and generating, based on the heat mapping, a plurality of additional tiles corresponding to the desired texture.

35. The system according to claim 29, wherein the generating the exemplar further comprises generating the exemplar using a Markov Random Field technique.

36. The system according to claim 29, wherein the defining the scale of the desired texture includes selecting the scale from a plurality of scales.

37. The system according to claim 36, wherein the plurality of scales includes at least one of the following a blurred image, an image containing a plurality of large averaged pixels, and an image having a smaller, lower resolution.

38. The system according to claim 36, further comprising adjusting a variability of the at least one selected tile from the plurality of tiles by performing at least one of a coarse adjustment of the scale and a fine adjustment of the scale.

39. The system according to claim 29, wherein each texture in the plurality of textures includes an array of a plurality of values, wherein each value is represented by a vector having a predetermined length.

40. The system according to claim 29, wherein at least one of the receiving, the determining, the generating the heat mapping, the generating the plurality of tiles, the selecting, and the generating the exemplar is performed on parallel processors.

41. The system according to claim 29, wherein the plurality of tiles includes at least one of the following: non-overlapping tiles and overlapping tiles.

42. The system according to claim 29, wherein the selecting further comprises selecting a sample of tiles from the plurality of tiles.

43. A computer-implemented method, comprising:
receiving an image, wherein the image is configured to include a plurality of pixels representing a plurality of textures within the image, wherein each texture in the plurality of textures is configured to be selectable by a user;
generating a plurality of texture scales for selection by the user, the plurality of texture scales are generated based on a location of at least one texture within the image at a predetermined time;
selecting at least one texture scale from the plurality of texture scales; and
generating, based on the selected texture scale, a texture in the plurality of textures of the image, the texture is generated based on a heat mapping of the image, wherein generation of the heat mapping includes
selecting a node from a plurality of nodes contained within the texture;
determining a distance between the selected node and at least another node in the plurality of nodes; and
determining, based on the distance, propagation of heat within the heat mapping;
wherein the selected node corresponds to a location of heat within the heat mapping;
wherein the heat is determined using $$h^{(t+1)}(x_i) = \frac{\sum_j W_{j,i} h^t(x_j)}{\sum_j W_{j,i}}$$

wherein $W_{j,i}$ is a weight between node i and node j in the plurality of nodes, and $h^t(x_i)$ is the heat at the node i at a time t;
wherein the receiving, the generating the plurality of texture scales, the selecting, and the generating the texture in the plurality of textures is performed on at least one processor.

44. The method according to claim 43, wherein the generating the plurality of texture scales comprises
generating the plurality of texture scales based on a blurred image configured to be obtained from the received image.

45. The method according to claim 43, wherein the generating the plurality of texture scales comprises
generating the plurality of texture scales based on an image configured to be obtained from the received image and further configured to contain a plurality of large averaged pixels.

46. The method according to claim 43, wherein the generating the plurality of texture scales comprises
generating the plurality of texture scales based on an image configured to be obtained from the received image and further configured to be a smaller, lower resolution image.

47. The method according to claim 43, further comprising using the selected texture scale for processing of an image.

48. A computer program product comprising a non-transitory machine-readable medium storing instructions that, when executed by at least one programmable processor, cause the at least one programmable processor to perform operations comprising:
receiving an image, wherein the image is configured to include a plurality of pixels representing a plurality of textures within the image, wherein each texture in the plurality of textures is configured to be selectable by a user;
generating a plurality of texture scales for selection by the user, the plurality of texture scales are generated based on a location of at least one texture within the image at a predetermined time;
selecting at least one texture scale from the plurality of texture scales; and
generating, based on the selected texture scale, a texture in the plurality of textures of the image, the texture is generated based on a heat mapping of the image, wherein generation of the heat mapping includes
selecting a node from a plurality of nodes contained within the texture;
determining a distance between the selected node and at least another node in the plurality of nodes; and
determining, based on the distance, propagation of heat within the heat mapping;
wherein the selected node corresponds to a location of heat within the heat mapping;
wherein the heat is determined using $$h^{(t+1)}(x_i) = \frac{\sum_j W_{j,i} h^t(x_j)}{\sum_j W_{j,i}}$$

wherein $W_{j,i}$ is a weight between node i and node j in the plurality of nodes, and $h^t(x_i)$ is the heat at the node i at a time t.

49. The computer program product according to claim 48, wherein the generating the plurality of texture scales comprises generating the plurality of texture scales based on a blurred image configured to be obtained from the received image.

50. The computer program product according to claim 48, wherein the generating the plurality of texture scales comprises
generating the plurality of texture scales based on an image configured to be obtained from the received image and further configured to contain a plurality of large averaged pixels.

51. The computer program product according to claim 48, wherein the generating the plurality of texture scales comprises
generating the plurality of texture scales based on an image configured to be obtained from the received image and further configured to be a smaller, lower resolution image.

52. The computer program product according to claim 48, further comprising
using the selected texture scale for processing of an image.

53. A system comprising:
at least one programmable processor; and
a machine-readable medium storing instructions that, when executed by the at least one programmable processor, cause the at least one programmable processor to perform operations comprising:
receiving an image, wherein the image is configured to include a plurality of pixels representing a plurality of textures within the image, wherein each texture in the plurality of textures is configured to be selectable by a user;
generating a plurality of texture scales for selection by the user, the plurality of texture scales are generated based on a location of at least one texture within the image at a predetermined time;
selecting at least one texture scale from the plurality of texture scales; and
generating, based on the selected texture scale, a texture in the plurality of textures of the image, the texture is generated based on a heat mapping of the image, wherein generation of the heat mapping includes
selecting a node from a plurality of nodes contained within the texture;
determining a distance between the selected node and at least another node in the plurality of nodes; and
determining, based on the distance, propagation of heat within the heat mapping;
wherein the selected node corresponds to a location of heat within the heat mapping;
wherein the heat is determined using $$h^{(t+1)}(x_i) = \frac{\sum_j W_{j,i} h^t(x_j)}{\sum_j W_{j,i}}$$

wherein $W_{j,i}$ is a weight between node i and node j in the plurality of nodes, and $h^t(x_i)$ is the heat at the node i at a time t.

54. The system according to claim 53, wherein the generating the plurality of texture scales comprises
generating the plurality of texture scales based on a blurred image configured to be obtained from the received image.

55. The system according to claim 53, wherein the generating the plurality of texture scales comprises
generating the plurality of texture scales based on an image configured to be obtained from the received image and further configured to contain a plurality of large averaged pixels.

56. The system according to claim 53, wherein the generating the plurality of texture scales comprises
generating the plurality of texture scales based on an image configured to be obtained from the received image and further configured to be a smaller, lower resolution image.

57. The system according to claim 53, further comprising
using the selected texture scale for processing of an image.

* * * * *